United States Patent
Kuschnerus et al.

(10) Patent No.: US 12,061,104 B2
(45) Date of Patent: Aug. 13, 2024

(54) FLOWMETER, METHOD FOR OPERATING A FLOWMETER, SYSTEM AND METHOD FOR OPERATING A SYSTEM

(71) Applicant: KROHNE Messtechnik GmbH, Duisburg (DE)

(72) Inventors: Dirk Kuschnerus, Krefeld (DE); Sven Walbrecker, Wesel (DE); Martin Krawczyk-Becker, Herne (DE); Hansjörg Mucke, Mönchengladbach (DE)

( * ) Notice: Subject to any disclaimer, the term of this patent is extended or adjusted under 35 U.S.C. 154(b) by 241 days.

(21) Appl. No.: 17/453,567

(22) Filed: Nov. 4, 2021

(65) Prior Publication Data

US 2022/0136877 A1    May 5, 2022

(30) Foreign Application Priority Data

Nov. 4, 2020  (DE) ..................... 10 2020 129 074.8

(51) Int. Cl.
  *G01F 1/58*  (2006.01)
(52) U.S. Cl.
  CPC .............. *G01F 1/584* (2013.01); *G01F 1/586* (2013.01)
(58) Field of Classification Search
  CPC ............ G01F 1/584; G01F 1/586; G01F 1/58; G01F 25/10
  See application file for complete search history.

(56) References Cited

U.S. PATENT DOCUMENTS

| | | |
|---|---|---|
| 5,831,175 A | 11/1998 | Fletcher-Haynes |
| 6,997,032 B2 | 2/2006 | Mattar |
| 7,185,526 B2 | 3/2007 | Mattar |
| 7,690,240 B2 | 4/2010 | Mattar |
| 8,573,026 B2 | 11/2013 | Fröhlich et al. |
| 2004/0200259 A1 | 10/2004 | Mattar |
| 2006/0090537 A1 | 5/2006 | Mattar |
| 2006/0155496 A1 | 7/2006 | Repko |
| 2007/0084298 A1 | 4/2007 | Rieder et al. |
| 2007/0144234 A1 | 6/2007 | Mattar |
| 2009/0071264 A1 | 3/2009 | Wray |

(Continued)

FOREIGN PATENT DOCUMENTS

| | | |
|---|---|---|
| CN | 109479578 A * | 3/2019 |
| DE | 10260959 A1 | 7/2004 |

(Continued)

*Primary Examiner* — Peter J Macchiarolo
*Assistant Examiner* — John M Royston
(74) *Attorney, Agent, or Firm* — Patrick D. Duplessis

(57) ABSTRACT

A flowmeter includes a control and evaluation unit, a sensor unit for capturing a primary variable, and a memory for storing data sets. The control and evaluation unit has a computing unit for determining the flow rate and/or for operating the sensor unit. The sensor unit is connected to the computing unit. During operation, the computing unit determines the flow rate from the primary variable, and determines the flow rate based on a data set and/or controls the sensor unit based on a data set. The data set includes a set of calibration values and/or a parameter for the operation of the sensor unit, and/or a parameter for determining the flow rate. The data set is assigned to a value of a state variable. The state variable is a medium parameter and/or a process parameter. The computing unit exchanges the data set depending on a change in the state variable.

18 Claims, 5 Drawing Sheets

(56) References Cited

U.S. PATENT DOCUMENTS

| | | |
|---|---|---|
| 2009/0211330 A1 | 8/2009 | Fröhlich et al. |
| 2010/0307220 A1 | 12/2010 | Mattar |
| 2011/0025376 A1 | 2/2011 | Grittke et al. |
| 2011/0056306 A1* | 3/2011 | Yamamoto ............. G01F 1/586 |
| | | 73/861.12 |
| 2019/0107850 A1 | 4/2019 | Kobayashi |
| 2020/0209022 A1 | 7/2020 | Suzuki et al. |

FOREIGN PATENT DOCUMENTS

| | | |
|---|---|---|
| DE | 10351313 A1 | 5/2005 |
| DE | 112004000612 T5 | 4/2006 |
| DE | 102005018396 A1 | 10/2006 |
| DE | 102010044182 A1 | 6/2012 |
| DE | 102016115397 A1 | 11/2017 |
| DE | 102018123434 A1 | 3/2020 |
| DE | 102019110957 A1 | 10/2020 |
| EP | 2082191 B1 | 8/2015 |
| EP | 3470800 A1 | 4/2019 |
| WO | 2007036418 A1 | 4/2007 |
| WO | 2015010072 A1 | 1/2015 |

* cited by examiner

FLOWMETER, METHOD FOR OPERATING A FLOWMETER, SYSTEM AND METHOD FOR OPERATING A SYSTEM

TECHNICAL FIELD

The invention is based on a flowmeter having at least one control and evaluation unit and having a sensor unit for capturing a primary variable, the control and evaluation unit having at least one computing unit for determining the flow rate and/or for operating the sensor unit, wherein the sensor unit is connected to the computing unit and wherein the computing unit is designed in such a way that, during operation, it determines the flow rate from the primary variable, and having at least one memory for storing a plurality of data sets.

BACKGROUND

Furthermore, the invention relates to a method for operating a flowmeter according to the invention, wherein a plurality of data sets is stored in the at least one memory.

Furthermore, the invention relates to a system, in particular a filling system for filling a fluid medium, comprising at least two flowmeters according to the invention, wherein the at least two flowmeters are arranged in the course of a pipe system, further comprising a communication system via which, during operation, the control and evaluation units of the flowmeters can communicate with one another.

Furthermore, the invention relates to a method for operating a system according to the invention.

Particularly in complex systems, such as systems for filling a medium, changing process conditions prevail, especially with respect to the media to be measured. For example, changing process conditions may occur regularly or as part of the process.

In beverage filling, such processes are for example:
Filling systems that change the fill medium, in particular media with different solids contents and/or media with different conductivities,
Filling systems that have to be cleaned frequently, wherein the cleaning medium differs in particular in temperature and/or conductivity from the medium to be filled,
Multiphase processes in which, within a filling process, first a very small quantity of one medium is filled and shortly afterwards, through the same filling valve, a larger quantity of another medium is filled, wherein the media may change in their properties, especially in viscosity, conductivity and/or solids content,
Processes in which the medium flows through the meter in forward and reverse directions.

Flowmeters known from the prior art work based on a standard configuration and/or a standard calibration, which is normally based on the measurement of water, regardless of the specific process situation at the customer. Consequently, if the process conditions deviate from the process conditions on which the standard configuration and/or standard calibration is based, the measurement process has an increased error.

From the publication EP 2 082 191 B1 it is known to provide partially reconfigurable functional modules for determining and monitoring a process variable by means of a field device, to which application-specific information is supplied via a control and evaluation unit.

DE 102 60 959 A1 relates to a fill level measuring device with a memory, wherein parameter sets for various applications are stored in the memory, wherein an evaluation unit selects a parameter set during operation and derives the fill level from the measurement signal on the basis of this parameter set. A parameter set preferably contains information about the installation height of the fill level meter in the vessel, the vessel geometry, possible installations or the dielectric constant of the filled product.

A method for the zero point correction of a measuring instrument is known from the publication DE 103 51 313 A1, wherein, initially, zero point measurements are carried out with different instrument and system parameters and a parameter set comprising both the zero measured value and an instrument and system parameter set are stored and wherein a suitable stored instrument and/or system parameter set is searched for during operation for the respective current system and instrument parameters, so that the zero measured value assigned to this parameter set is used as the current zero point value.

DE 10 2005 018 396 A1 discloses a method for determining the volumetric or mass flow rate of a medium, wherein different flow profiles of a measuring medium are successively formed in the pipeline or in the measuring tube during a calibration phase, wherein each flow profile formed in the pipeline or in the measuring tube is described by a characteristic parameter set, and wherein a flow profile-dependent correction factor is calculated for each flow profile, and wherein a volume or mass flow rate determined via the parameter set is subsequently corrected during measuring operation with the flow profile-dependent correction factor determined during the calibration phase.

DE 10 201 044 182 discloses a system for setting a measuring device comprising the measuring device, an analysis tool and a database, in which the data sets having analysis data for different process conditions and associated parameter sets for setting the measuring device are stored or in which a plurality of models with associated calculation rules are stored, and having a calculation/control unit which determines the data set of the stored analysis data which has the maximum agreement with the determined analysis data and sets the measuring device in accordance with the associated parameter set. The setting of the measuring device concerns, for example, filter settings with which, for example, reflections at interfering factors or noise signals are masked out.

The document WO 2015/010072 A1 relates to a method for measuring a process medium with a measuring device that has at least two process medium matrices, wherein the relevant process medium matrix is selected during operation based on the properties of the process medium, and wherein the concentration of the process medium is determined based on the process medium matrix.

A method for processing a frequency modulated continuous wave (FMCW) radar signal, comprising the following steps, is known from the publication DE 10 2016 115 397 A1: Retrieving a configuration parameter set corresponding to a working environment or a detected material, selectively executing a process corresponding to the configuration parameter set, and analyzing the processed signal and generating a detection result.

In addition, the publication DE 10 2018 123 434 A1 relates to a field device in automation technology, wherein a plurality of parameter sets are stored in a memory unit, and wherein the operation of the field device is based on a parameter set depending on an environmental variable. In detail, the variable parameters concern settings of the field device, in particular settings with regard to warning messages or with regard to the temporal operation of the measuring device or with regard to the menu display of the display unit.

SUMMARY

Based on the described prior art, the object of the invention is to provide a flowmeter which has an increased measuring accuracy. In addition, it is the object of the invention to provide a method for operating a flowmeter which has an increased measuring accuracy. Furthermore, it is the object of the invention to provide a system comprising at least two flowmeters according to the invention and a method for operating such a system having an increased measurement accuracy.

According to a first teaching of the invention, the aforementioned object is achieved by a flowmeter described in the introduction in that the computing unit determines the flow rate during operation based on at least one data set and/or controls the sensor unit based on at least one data set, wherein the at least one data set comprises at least one set of calibration values and/or at least one parameter for the operation of the sensor unit, in particular for the control of the sensor unit, and/or at least one parameter for determining the flow rate, wherein the at least one data set is assigned to at least one value of a state variable, wherein the at least one state variable is, in particular, a medium parameter and/or a process parameter, and wherein the computing unit is designed in such a way that it exchanges the data set during operation depending on a change in the state variable.

According to one design of the invention, the memory is arranged in the control and evaluation unit. Alternatively, the memory is arranged externally, preferably in an external control unit.

Particularly preferably, the computing unit is configured in such a way that it selects the at least one data set associated with the state variable depending on the value of at least one state variable during operation for determining the flow rate and/or for operating the sensor unit, in particular for controlling the sensor unit.

Basically, it is to be noted that an order of a method for operating such a flowmeter is not intended to be set by the aforementioned features. In this respect, reference is made to the explanations regarding the corresponding method.

According to the invention, it has been recognized that the measuring accuracy of a flowmeter can be increased in that the flowmeter is designed such that, during operation, the parameters relevant for calculating the flow rate and/or the parameters for operating the sensor unit, in particular the parameters for controlling the sensor unit, can be adapted to the respective current operating conditions. In this way, the operation of the flowmeter can be adapted to the respective measurement situation, and in this respect the error of the flow measurement can be minimized and the measurement accuracy can therefore be increased.

In contrast to the prior art of DE 10 2018 123 434 A1, the present invention is thus not concerned with adapting settings of the flowmeter to optimize the operation of the flowmeter, which is independent of the actual measurement process, but rather with adapting precisely the parameters on which the measurement process and/or the evaluation of the measured data are based.

The flowmeter according to the invention is particularly preferably a magnetic-inductive flowmeter. According to another equally preferred design, the flowmeter is a Coriolis flowmeter or an ultrasonic flowmeter or a vortex flowmeter.

If the flowmeter is a magnetic-inductive flowmeter the at least one parameter for the operation of the sensor unit is the field frequency of the magnetic field and/or a parameter for controlling the magnetic field and/or the zero point setting and/or the gain for low flow velocities and/or the measuring range setting and/or the field current strength and/or a constant for the flow direction.

For the further flowmeters mentioned, the parameters relating to the operation or the control of the sensor unit are designed according to the principle forming the basis of the measuring device.

Particularly preferably, a data set has at least two parameters for operation, in particular for controlling the sensor unit and/or for determining the flow rate. This design has the advantage that the parameterization of the flowmeter adapted for a state variable can be carried out particularly simply by selecting a data set.

According to one design, each data set is associated with a range of values of a state variable.

According to a next design, the parameters stored in the plurality of data sets differ in their nature.

For example, if the flowmeter is designed as a magnetic-inductive flowmeter, at least one data set comprises parameters regarding the field frequency of the magnetic field and another data set comprises a constant for the flow direction. In this respect, parameters independent of each other can be set separately during operation. Preferably, data sets having different parameters in their nature are assigned to different state variables.

According to this design, the computing unit is preferably designed in such a way that it selects individual parameters from a plurality of data sets during operation for determining the flow rate and/or for operating the sensor unit.

According to a particularly preferred design, at least one further sensor is provided for measuring the state variable, in particular for measuring at least one process parameter and/or one medium parameter, wherein the at least one further sensor is preferably connected to the computing unit. During operation, the at least one further sensor preferably forwards the measured value of the state variable to the computing unit, which then selects at least one data set for determining the flow rate and/or for operating the sensor unit depending on the measured state variable.

According to a particularly preferred design, the computing unit has a sensor interface to the at least one further sensor for measuring the state variable, in particular for measuring a process parameter and/or a medium parameter, wherein the at least one further sensor can be part of the flowmeter or wherein the at least one further sensor can be arranged separately from the flowmeter or wherein the at least one further sensor can be part of a further measuring device.

For example, the at least one further sensor may also be arranged in an external control unit.

Particularly preferably, the at least one further sensor or the further measuring device is connected to the computing unit via a cable connection or a wireless connection, in particular via a radio connection.

Particularly preferably, the at least one further sensor is a conductivity sensor and/or a temperature sensor and/or a pressure sensor and/or an acceleration sensor and/or a sensor for measuring the density of the medium and/or a sensor for measuring the composition of the medium and/or a sensor for measuring the flow direction of the medium.

According to a next design, the control and evaluation unit comprises a, preferably digital, device interface, wherein preferably the control and evaluation unit is connected to the external control unit via the device interface. Also preferably, the device interface is connected to the computing unit and/or the at least one further sensor. The state variable and/or the at least one data set on which the measurement is to be based can be specified, for example manually, or a measurement of the state variable by the further sensor can be requested via such an interface. Furthermore, the computing unit can be connected via the device interface to a further, preferably higher-level, control unit or to a further flowmeter, so that the computing unit receives the state variable and/or the data set on which the measurement is to be based from another device via the device interface.

According to one design, the sensor interface corresponds to the device interface.

The state variable can also define a temporal process segment. For example, the state variable may be a command to close valves in a filling line. If the computing unit of the flowmeter receives this command via the device interface, in particular by reading the communication, the computing unit selects the at least one data set associated with this command for operating the sensor unit and/or for determining the flow rate.

According to a second teaching of the present invention, the object described in the introduction is achieved by a method for operating a flowmeter mentioned at the beginning, in that the method comprises the following steps:

Selection of at least one data set on which the measurement is to be based, preferably by measuring a state variable, Operation of the sensor unit according to the at least one selected data set, Capture of a primary variable by the sensor unit and forwarding the primary variable to the computing unit, Determination of the flow rate by the computing unit from the primary variable and preferably the at least one selected data set.

For this, the flowmeter is preferably designed according to one of the previously described designs. The first step of selecting at least one data set does not have to be executed anew before each measurement. According to one design of the method, at least one data set is selected for operating the sensor unit and/or for determining the flow rate, and this at least one data set is also used as a basis for subsequent measurements. For example, the state variable can be determined at regular intervals and/or the at least one selected data set is used as the basis for the measurement until the computing unit receives notification that a new process segment is starting, with which the data set is reselected.

According to the invention, the data set on which the measurement is to be based is exchanged depending on the value of the state variable associated with the data set.

According to one design, the at least one state variable is determined anew before each measurement.

The at least one state variable is preferably a process parameter, in particular the velocity of the medium and/or the temperature of the medium or the temperature inside the measuring tube and/or the pressure of the medium or the pressure inside the measuring tube. In addition, the state variable can also be a medium parameter, in particular the density of the medium and/or the conductivity of the medium and/or the composition of the medium.

However, the state variable can also define a temporal process segment. For example, the state variable can be a command to operate a valve and/or information about the position or location of the flowmeter.

According to a further design, the computing unit obtains the value of the state variable via a device interface by reading the communication between other devices and/or explicitly from another device and/or manually by the user. According to a further design, the data set on which the measurement is to be based is communicated to the control and evaluation unit by an external control unit via the device interface.

According to a next design, the at least one further sensor determines the at least one state variable.

According to a third teaching of the present invention, the object mentioned in the introduction is achieved by a system described at the beginning in that the flowmeters are designed and linked to one another in such a way that, during operation, they use an identical data set or identical data sets for determining the flow rate and/or for operating the respective sensor unit, in particular for controlling the respective sensor unit, depending on the value of at least one state variable.

This design has the advantage that, on the one hand, the operation of the flowmeters can be adapted to the current measurement situation and, on the other hand, it can be ensured that all flowmeters operate based on an identical data set or identical data sets.

Particularly preferably, at least partially identical data sets are stored in the at least two control and evaluation units of the flowmeters for this purpose.

Alternatively, there can be at least one external memory associated with the flowmeters. For example, the at least one external memory can be arranged in a central control unit.

Particularly preferably, a central control unit is provided which is connected to the at least two flowmeters designed according to the invention via the communication system and which, during operation, communicates the state variable to the control and evaluation units so that the flowmeters select the at least one corresponding data set depending on the transmitted state variable.

According to a next design, a central control unit is provided which is connected to the at least two flowmeters via the communication system, wherein the central control unit communicates the at least one data set on which the measurement is to be based to the control and evaluation units during operation. For example, the central control unit can have a further sensor for determining the state variable for this purpose.

According to one design, the system is a filling system for controlled filling of a medium into at least one vessel. Particularly preferably, the flowmeters are each arranged in the area of a filling point. By adapting the parameters of the flowmeters to the current measurement situation, the error in the flow measurement can be minimized and thus the accuracy of the filling process can be increased.

According to a further design, the system can also be a batch system or also another system in which a change of process conditions or changing compositions of the media occur regularly or as part of the process.

According to a fourth teaching of the present invention, the object described in the introduction is achieved by a method described at the beginning for operating a system in that the flowmeters designed according to the invention use an identical data set or identical data sets during operation for operating the sensor unit and/or for determining the flow rate.

According to a particularly preferred design of the method, a central control unit is provided which is connected to the at least two flowmeters designed according to the invention via the communication system, wherein the central control unit communicates the state variable to the control and evaluation units during operation, so that the flowmeters select the corresponding data set depending on the communicated state variable, or wherein the central control unit communicates the data set on which the measurement is to be based to the control and evaluation units during operation.

It is also particularly preferred if exactly one flowmeter is designed in such a way that it selects the data set during operation and communicates it to the other flowmeters via the communication system.

If the flowmeters are arranged one behind the other in the flow direction of the medium, the one flowmeter that determines the relevant data set can be the first flowmeter in the flow direction.

BRIEF DESCRIPTION OF THE DRAWINGS

There is a plurality of possibilities for designing and further developing the flowmeter according to the invention, the method according to the invention and the filling system according to the invention. For this, reference is made to the following description of preferred embodiments in conjunction with the drawings.

DETAILED DESCRIPTION

The embodiments described below relate to a magnetic-inductive flowmeter. Of course, this is not a limitation of the invention to this measuring principle. The invention can just as advantageously be implemented with other flowmeters.

Figure 1:
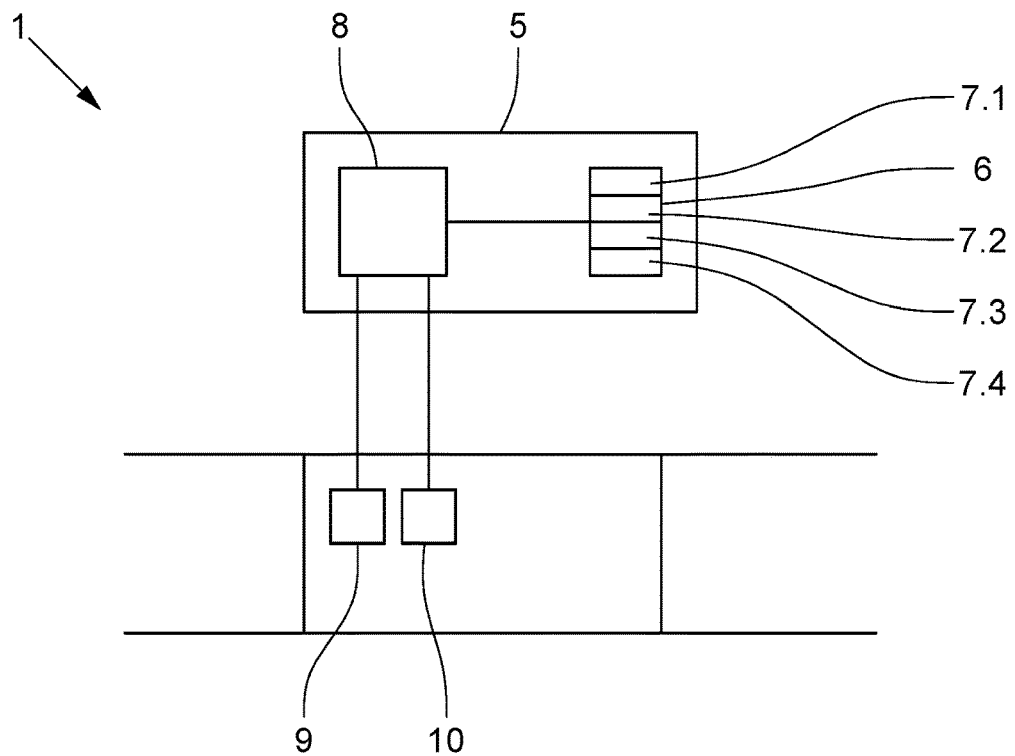
FIG. 1 illustrates a first embodiment of a flowmeter according to the invention.

FIG. 1 shows a first embodiment of a flowmeter 1 according to the invention with a control and evaluation unit 5, wherein the control and evaluation unit 5 has a memory 6 for storing a plurality of data sets 7.1, 7.2, 7.3 and 7.4 and a computing unit 8. In the embodiment shown, the flowmeter 1 is designed as a magnetic-inductive flowmeter. The data sets 7.1, 7.2, 7.3 and 7.4 stored in the memory 6 relate to the field frequency and the parameters for controlling the magnetic field overshoot and settling time. The data set 7.1 comprises the field frequency A, overshoot A and settling time A for forward filling and the data set 7.2 comprises the field frequency B, overshoot B and settling time B for reverse filling.

Furthermore, a sensor unit 9 is provided for capturing a primary variable, in this case the voltage between the measuring electrodes, wherein the sensor unit 9 is connected to the computing unit 8, and wherein the computing unit 8 determines the flow rate from the primary variable during operation.

In addition, the computing unit 8 is linked to the memory 6 in such a way that the computing unit 8 accesses a data set 7.1, 7.2, 7.3, 7.4 for determining the flow rate and/or for operating the sensor unit 9. Thereby, each data set 7.1, 7.2, 7.3, 7.4 is linked to at least one state variable. In the illustrated embodiment, data set 7.1 is linked to a forward measurement and data set 7.2 is linked to a reverse measurement.

A further sensor 10 is provided for determining the state variable. Depending on the respective state variable, the computing unit 8 selects the data set associated with the state variable for determining the flow rate or for operating the sensor unit.

In this respect, the flowmeter 1 shown has the advantage that the respective measurement situation or also changes in the measurement situation are taken into account in the operation of the sensor unit 9 and in the determination of the flow rate, so that, as a result, the accuracy of the flow rate determination can be improved.

Figure 2:
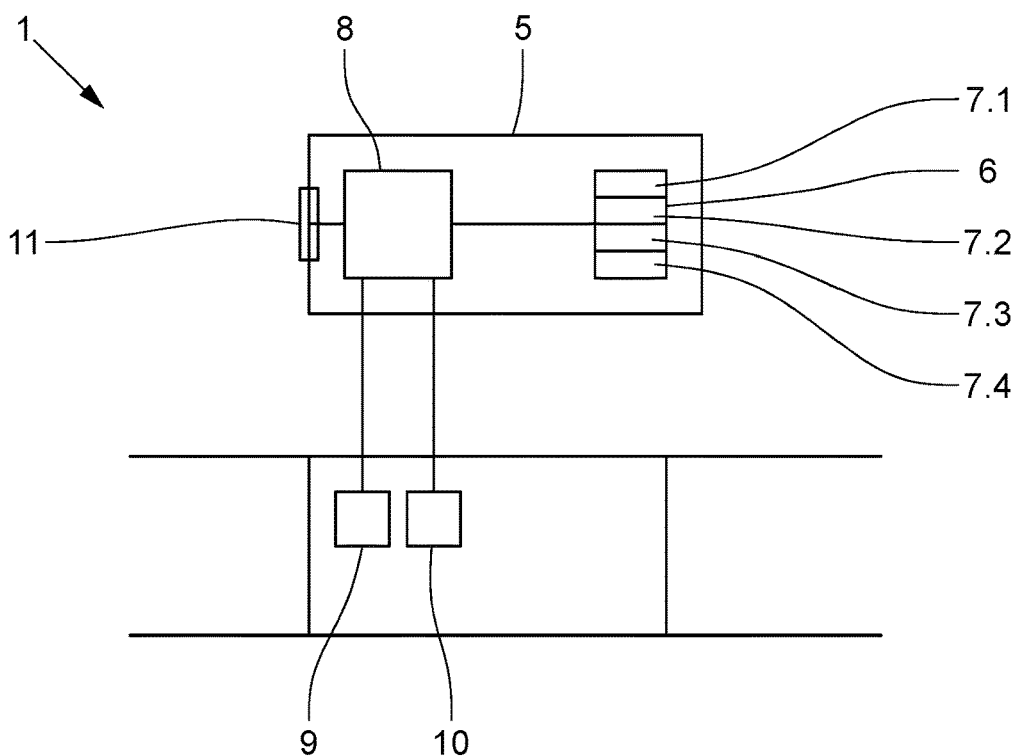
FIG. 2 illustrates a second embodiment of a flowmeter according to the invention.

The flowmeter 1 shown in FIG. 2 has a conductivity sensor as a further sensor 10 for determining the state variable. During operation, the conductivity sensor forwards the measured value of the conductivity to the computing unit 8. Depending on the measured conductivity, the computing unit 8 selects a data set 7.1, 7.2, 7.3 and 7.4 on which subsequent measurement is based.

In addition, an interface 11 is provided via which the computing unit 8 can also receive external commands regarding a further state variable or also the value of a further state variable from a separately arranged sensor.

In this respect, the flowmeter 1 shown is designed so that the data set on which the measurement is based can also be changed if the measurement situation changes.

Figure 3:
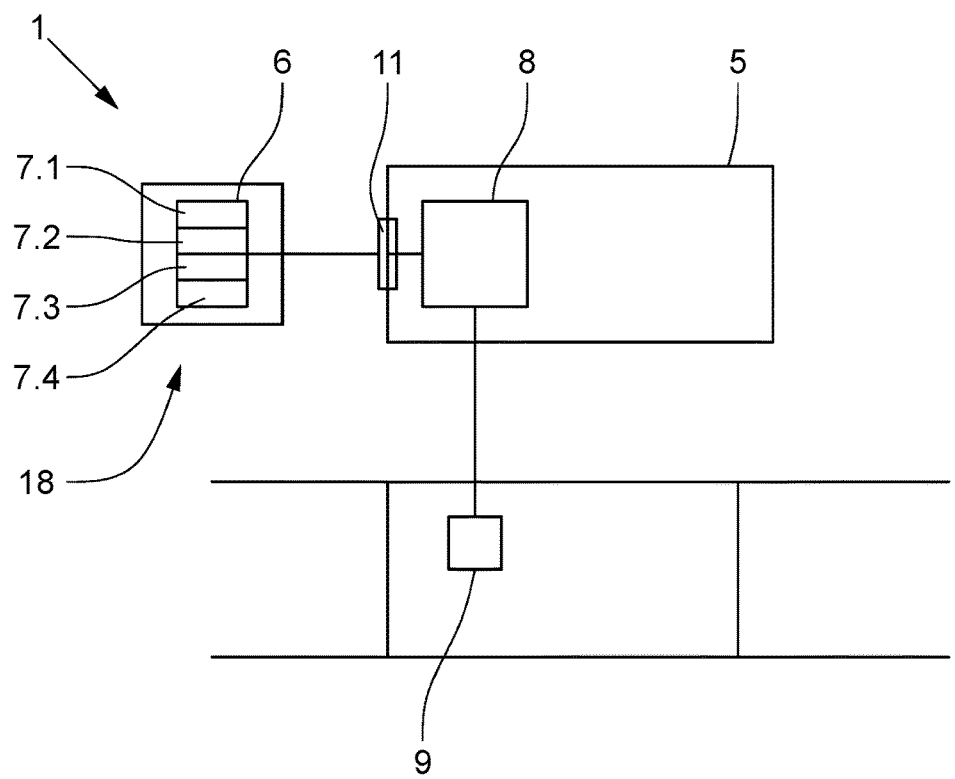
FIG. 3 illustrates a third embodiment of a flowmeter according to the invention.

In contrast to the embodiment shown in FIG. 2, in the embodiment of a flowmeter 1 shown in FIG. 3, the memory 6 with the plurality of data sets 7.1, 7.2, 7.3, 7.4 is arranged in an external control unit 18. During operation, the control and evaluation unit 5 receives the at least one data set 7.1, 7.2, 7.3, 7.4 for determining the flow rate and/or for the operation of the sensor unit 9, in particular for the control of the sensor unit 9 from the external control unit 18 via the device interface 11.

Figure 4:
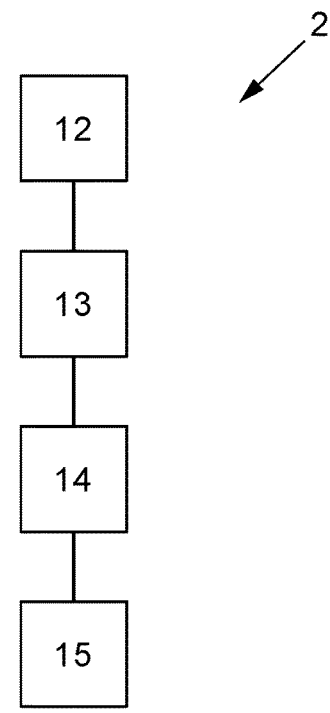
FIG. 4 illustrates an embodiment of a method for operating a flowmeter according to the invention.

FIG. 4 shows a first embodiment of a method 2 for operating a flowmeter 1, wherein the flowmeter 1 is designed according to the embodiment shown in FIG. 1.

The method has the following steps:
Selection 12 of a data set 7.1, 7.2, 7.3, 7.4 on which the measurement is to be based by measuring a state variable by means of the additional sensor 10,
Operation 13 of the sensor unit 9 according to the selected data set 7.1, 7.2, 7.3, 7.4,
Capture 14 of a primary variable by the sensor unit 9 and forwarding the primary variable to the computing unit 8,
Determination 15 of the flow rate by the computing unit 8 from the primary variable and the selected data set 7.1, 7.2, 7.3, 7.4.

Figure 5:
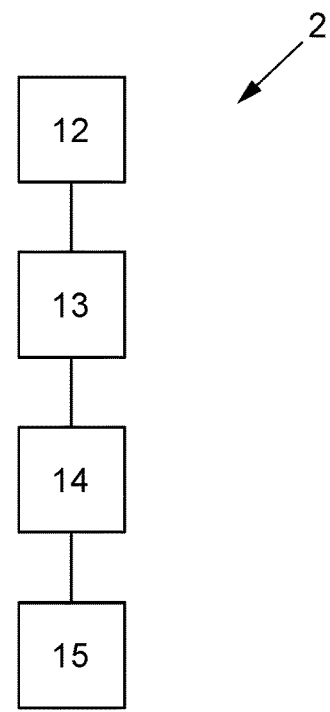
FIG. 5 illustrates a further embodiment of a method according to the invention for operating a flowmeter

FIG. 5 shows a further embodiment of a method 2 for operating a flowmeter 1, wherein the flowmeter 1 is designed according to the embodiment shown in FIG. 2.

The method 2 has the following steps:

Selection 12 of a data set 7.1, 7.2, 7.3, 7.4 on which the measurement is to be based, wherein the computing unit 8 receives information about the current process section via the device interface 11 and selects the data set 7.1, 7.2, 7.3, 7.4 based on this information, Operation 13 of the sensor unit 9 according to the selected data set 7.1, 7.2, 7.3, 7.4, Capture 14 of a primary variable by the sensor unit 9 and forwarding to the computing unit 8, Determination 15 of the flow rate by the computing unit 8 from the primary variable and the selected data set 7.1, 7.2, 7.3, 7.4.

Figure 6:
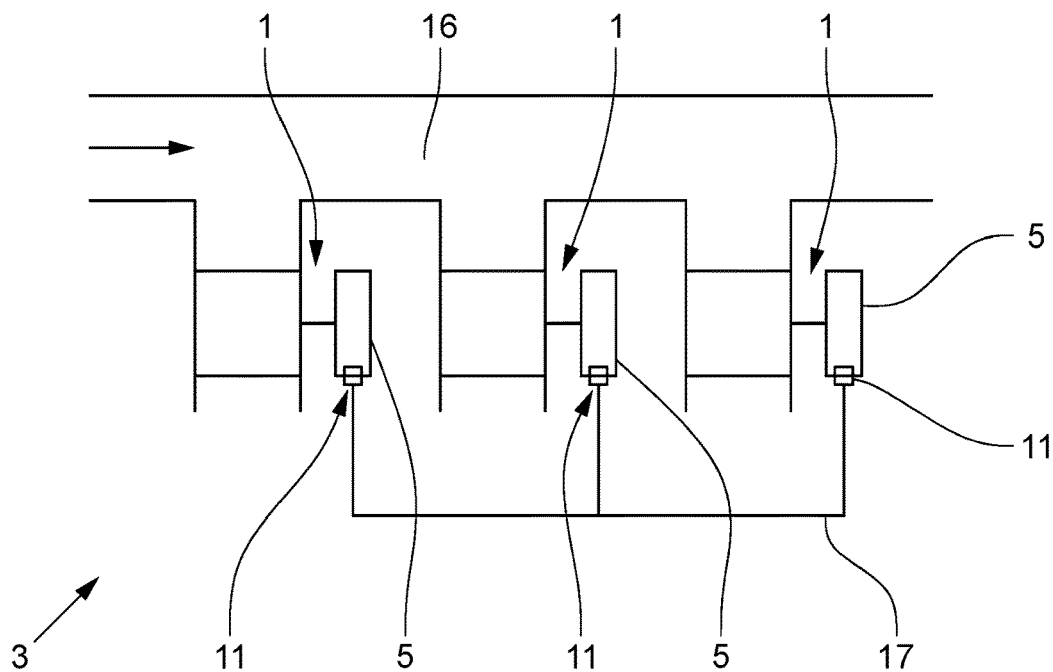
FIG. 6 illustrates an embodiment of a system according to the invention.

FIG. 6 shows a first embodiment of a system 3 according to the invention, which is designed as a filling system in the embodiment shown. Three flowmeters 1 are arranged on a pipe system 16, each in the area of a filling point.

The flowmeters 1 are coordinated with each other in such a way that identical data sets 7.1, 7.2, 7.3, 7.4 are stored in the three control and evaluation units 5. In addition, a communication system 17 in the form of a communication bus is provided via which the control and evaluation units 5 of the flowmeters 1 communicate with each other during operation.

In the illustrated embodiment, the flowmeter arranged first in the direction of flow, which is indicated by means of an arrow, determines the data set to be used as a basis for the subsequent measurement for the operation of the respective sensor unit 9 and for determining the flow rate, and communicates the selected data set 7.1, 7.2, 7.3, 7.4 to the other flowmeters 1 via the communication system 17.

This ensures that the depicted filling system uses the same parameters for controlling the flowmeters as well as for calculating the flow rate at all filling points during operation.

As a result, the system shown has a particularly high measuring accuracy.

Figure 7:
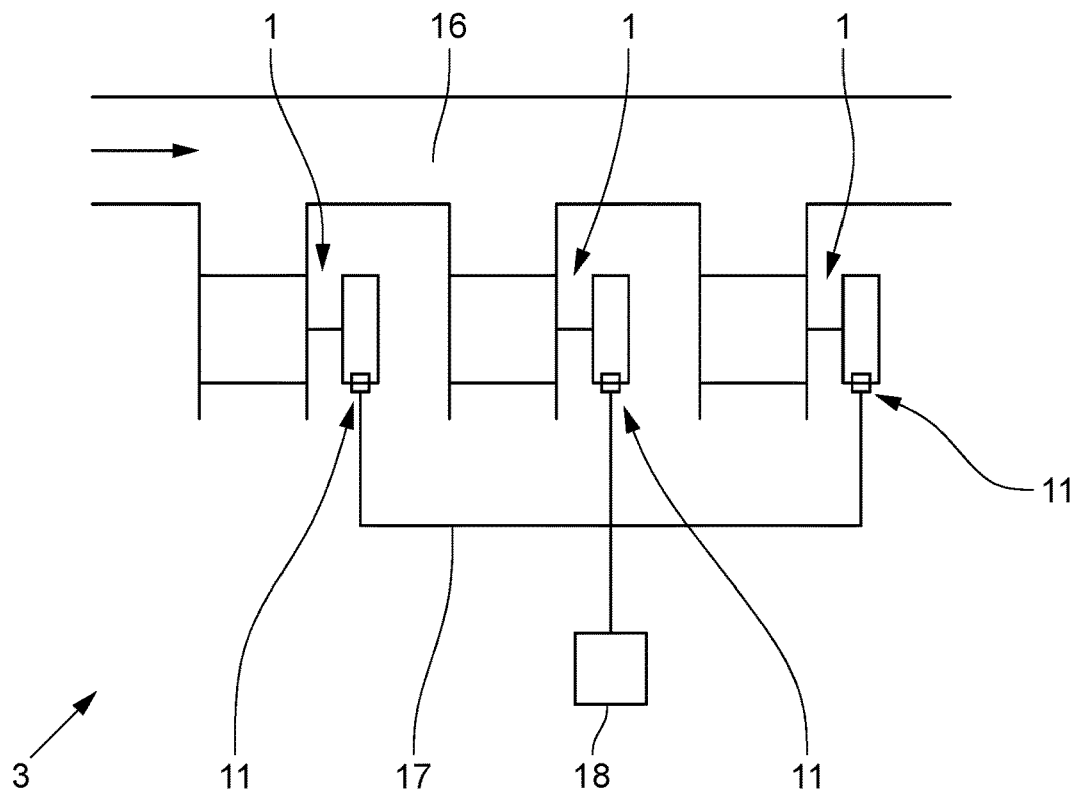
FIG. 7 illustrates a second embodiment of a system according to the invention.

FIG. 7 shows a second embodiment of a filling system 3 with three flowmeters 1 designed according to the invention, which are connected to one another via a communication system 17, wherein each flowmeter 1 is arranged in the area of a filling point. In addition, a central control unit 18 is provided, which communicates the state variable for selecting the data set 7.1, 7.2, 7.3, 7.4 on which the measurement is to be based to the flowmeters 1.

Figure 8:
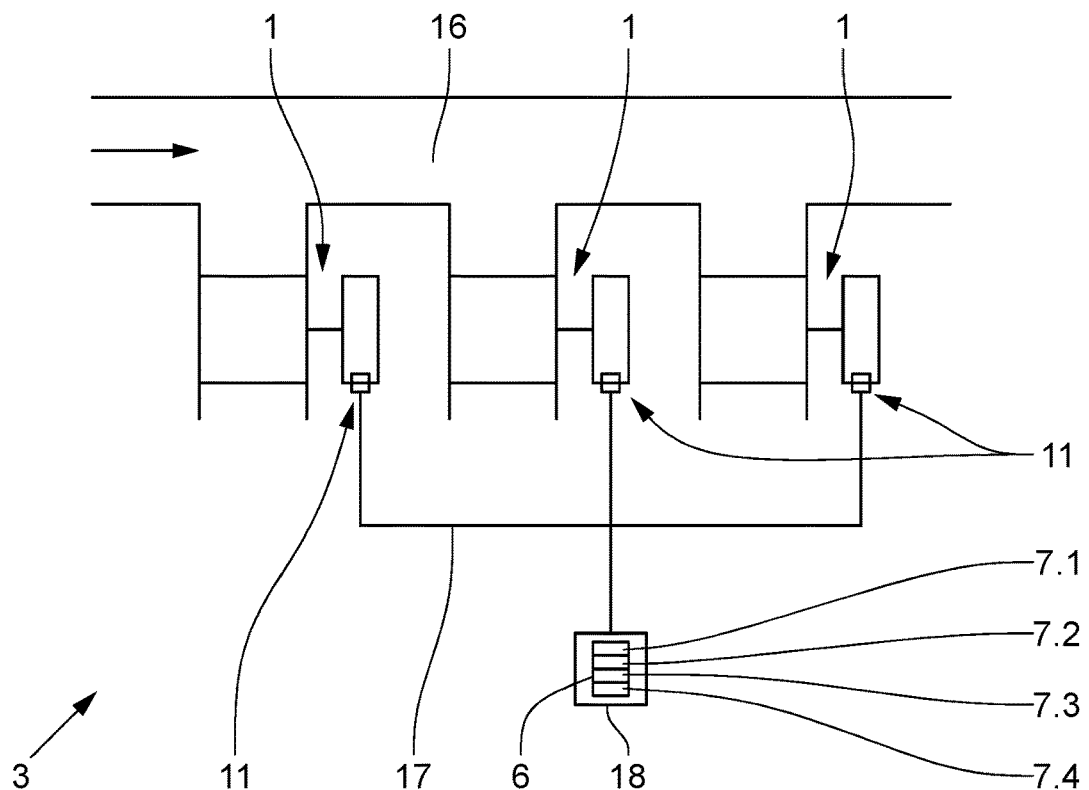
FIG. 8 illustrates a third embodiment of a system according to the invention.

FIG. 8 shows a further embodiment of a filling system 3, wherein, in contrast to the embodiment shown in FIG. 7, the central control unit 18 is not only designed in such a way that it communicates a state variable to the individual flowmeters during operation. Rather, the plurality of data sets 7.1, 7.2, 7.3, 7.4 to be selected are already stored in the central control unit 18, so that, during operation, the central control unit 18 communicates an identical data set 7.1, 7.2, 7.3, 7.4 to the flowmeters 1 for determining the flow rate and/or for operating the sensor unit 9.

Figure 9:
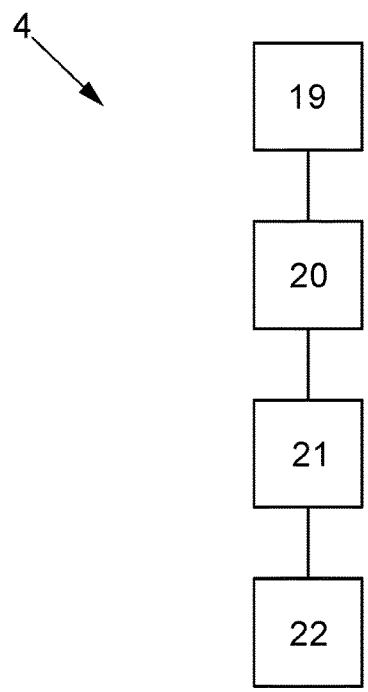
FIG. 9 illustrates an embodiment of a method for operating a system according to the invention.

FIG. 9 shows an embodiment of a method 4 for operating a system 3 comprising a plurality of flowmeters 1, wherein the system 3 is designed according to the embodiment shown in FIG. 5.

In a first step 19, the flowmeter 1 arranged first in the flow direction determines the data set 7.1, 7.2, 7.3, 7.4 relevant for flow measurement and for operating the sensor unit 9. In a next step 20, this first flowmeter 1 communicates the selected data set 7.1, 7.2, 7.3, 7.4 to the other flowmeters 1. Subsequently, the flowmeters 1 are operated according to the selected data set 7.1, 7.2, 7.3, 7.4 21. In a next step 22, the flow through the different flowmeters 1 is determined based on the selected identical data set 7.1, 7.2, 7.3, 7.4.

Figure 10:
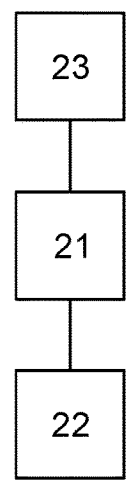
FIG. 10 illustrates a second embodiment of a method for operating a system according to the invention.

In addition, FIG. 10 shows a second embodiment of a method 4 for operating a system 3, wherein the system 3 is designed according to the embodiment shown in FIG. 6.

In a first step 23, the central control unit 18 here communicates the state variable for selecting the data set on which the subsequent measurement is to be based to the individual flowmeters 1 via the communication channel 17. Subsequently, the flowmeters 1 are operated according to the selected data set 7.1, 7.2, 7.3, 7.4 21. In a next step 22, the flow rate through the different flowmeters 1 is determined based on the same data set 7.1, 7.2, 7.3, 7.4.

As a result, the illustrated method also has an increased accuracy of filling a medium due to the improved flow measurement.

The invention claimed is:

1. A flowmeter, comprising:
   at least one control and evaluation unit;
   a sensor unit for capturing a primary variable;
   wherein the control and evaluation unit has at least one computing unit for determining the flow rate and/or for operating the sensor unit;
   wherein the sensor unit is connected to the computing unit;
   wherein the computing unit is designed in such a way that, during operation, the computing unit determines the flow rate from the primary variable;
   wherein the flowmeter further comprises at least one memory associated with the flowmeter for storing a plurality of data sets;
   wherein, during operation, the computing unit determines the flow rate based on at least one data set of the plurality of data sets and/or controls the sensor unit based on the at least one data set of the plurality of data sets;
   wherein the at least one data set includes at least one set of calibration values and/or at least one parameter for the operation of the sensor unit, and/or at least one parameter for determining the flow rate;
   wherein the at least one data set is selected based on at least one value of a state variable;
   wherein the at least one state variable is a medium parameter and/or a process parameter; and
   wherein the computing unit is designed in such a way that the computing unit changes the selection of the at least one data set with at least one other data set of the plurality of data sets during operation depending on a change in the state variable.

2. The flowmeter according to claim 1, wherein the computing unit has a sensor interface to at least one further sensor for measuring a process parameter and/or a medium parameter.

3. The flowmeter according to claim 2, wherein the at least one further sensor is connected to the computing unit via a cable connection or a wireless connection.

4. The flowmeter according to claim 2, wherein the at least one further sensor is a conductivity sensor and/or a temperature sensor and/or a pressure sensor and/or an acceleration sensor and/or a sensor for measuring the density of the medium and/or a sensor for measuring the composition of the medium and/or a sensor for measuring the flow direction of the medium.

5. The flowmeter according to claim 1, wherein the control and evaluation unit has a device interface; and
   wherein the control and evaluation unit is connected to an external control unit via the device interface.

6. A method for operating a flowmeter, the flowmeter including at least one control and evaluation unit and a sensor unit for capturing a primary variable, wherein the control and evaluation unit has at least one computing unit for determining the flow rate and/or for operating the sensor unit, wherein the sensor unit is connected to the computing unit, wherein the computing unit is designed in such a way that, during operation, the computing unit determines the flow rate from the primary variable, wherein the flowmeter further comprises at least one memory associated with the flowmeter for storing a plurality of data sets, wherein, during operation, the computing unit determines the flow rate based on at least one data set of the plurality of data sets and/or controls the sensor unit based on the at least one data set, wherein the at least one data set includes at least one set of calibration values and/or at least one parameter for the operation of the sensor unit, and/or at least one parameter for determining the flow rate, wherein the at least one data set is selected based on at least one value of a state variable, wherein the at least one state variable is a medium parameter and/or a process parameter, and wherein the computing unit is designed in such a way that the computing unit changes the selection of the at least one data set with at least one other data set of the plurality of data sets during operation depending on a change in the state variable, wherein the plurality of data sets is stored in the at least one memory, the method comprising:
  selecting the at least one data set of the plurality of data sets on which the measurement is to be based, by measuring a state variable;
  operating the sensor unit according to the selected at least one data set;
  capturing a primary variable by the sensor unit and forwarding to the computing unit; and
  determining the flow rate by the computing unit from the primary variable and the selected at least one data set.

7. The method according to claim 6, wherein the at least one state variable is a medium parameter and/or a process parameter.

8. The method according to claim 7, wherein the at least one process parameter is the velocity of the medium and/or the temperature of the medium and/or the pressure of the medium.

9. The method according to claim 7, wherein the at least one medium parameter is the density of the medium and/or the conductivity of the medium and/or the composition of the medium.

10. The method according to claim 6, wherein a device interface is provided and the selection of the at least one data set on which the measurement is to be based is carried out by a command via the device interface or the control and evaluation unit is informed of the at least one data set on which the measurement is to be based by an external control unit via the device interface.

11. A system, comprising:
  at least two flowmeters, each including:
    at least one control and evaluation unit;
    a sensor unit for capturing a primary variable;
    wherein the control and evaluation unit has at least one computing unit for determining the flow rate and/or for operating the sensor unit;
    wherein the sensor unit is connected to the computing unit;
    wherein the computing unit is designed in such a way that, during operation, the computing unit determines the flow rate from the primary variable;
    wherein the flowmeter further comprises at least one memory associated with the flowmeter for storing a plurality of data sets;
    wherein, during operation, the computing unit determines the flow rate based on at least one data set of the plurality of data sets and/or controls the sensor unit based on the at least one data set of the plurality of data sets;
    wherein the at least one data set includes at least one set of calibration values and/or at least one parameter for the operation of the sensor unit, and/or at least one parameter for determining the flow rate;
    wherein the at least one data set is selected based on at least one value of a state variable;
    wherein the at least one state variable is a medium parameter and/or a process parameter; and
    wherein the computing unit is designed in such a way that the computing unit changes the selection of the at least one data set to at least one other data set of the plurality of data sets during operation depending on a change in the state variable;
  wherein the at least two flowmeters are arranged in the course of a pipe system;
  a communication system via which the control and evaluation units of the flowmeters can communicate with one another during operation;
  wherein the flowmeters are designed and linked to one another in such a way that, during operation, the flowmeters use an identical data set or identical data sets of the plurality of data sets depending on at least one state variable for determining the flow rate and/or for operating the respective sensor unit.

12. The system according to claim 11, wherein the system is a filling system for filling a medium fluid.

13. The system according to claim 11, wherein at least partially identical data sets of the plurality of data sets are stored in the at least two control and evaluation units of the flowmeters.

14. The system according to claim 11, wherein a central control unit is provided which is connected to the at least two flowmeters via the communication system and which, during operation, communicates the state variable to the control and evaluation units so that the flowmeters select at least one corresponding data set of the plurality of data sets depending on the communicated state variable.

15. The system according to claim 11, wherein a central control unit is provided which is connected to the at least two flowmeters via the communication system, wherein the central control unit communicates the at least one data set on which the measurement is to be based to the control and evaluation units during operation.

16. A method for operating a system, the system including at least two flowmeters, each having at least one control and evaluation unit and a sensor unit for capturing a primary variable, wherein the control and evaluation unit has at least one computing unit for determining the flow rate and/or for operating the sensor unit, wherein the sensor unit is connected to the computing unit, wherein the computing unit is designed in such a way that, during operation, the computing unit determines the flow rate from the primary variable, wherein the flowmeter further comprises at least one memory associated with the flowmeter for storing a plurality of data sets, wherein, during operation, the computing unit determines the flow rate based on at least one data set of the plurality of data sets and/or controls the sensor unit based on at least one data set of the plurality of data sets, wherein the at least one data set includes at least one set of calibration values and/or at least one parameter for the operation of the sensor unit, and/or at least one parameter for determining the flow rate, wherein the at least one data set is selected based on at least one value of a state variable, wherein the at least one state variable is a medium parameter and/or a process parameter, wherein the computing unit is designed in such a way that the computing unit changes the selection of the at least one data set to at least one other data set of the plurality of data sets during operation depending on a change in the state variable, wherein the at least two flowmeters are arranged in the course of a pipe system, the system further including a communication system via which the control and evaluation units of the flowmeters can communicate with one another during operation, wherein the flowmeters are designed and linked to one another in such a way that, during operation, the flowmeters use an identical data set or identical data sets of the plurality of data sets depending on at least one state variable for determining the flow rate and/or for operating the respective sensor unit, the method comprising:

operating each of the at least two flowmeters according to the following steps:

selecting the at least one data set of the plurality of data sets on which the measurement is to be based, by measuring a state variable;

operating the sensor unit according to the selected at least one data set;

capturing a primary variable by the sensor unit and forwarding to the computing unit; and determining the flow rate by the computing unit from the primary variable and the selected at least one data set;

wherein the at least two flowmeters use an identical data set or identical data sets of the plurality of data sets for operating the sensor unit and/or for determining the flow rate.

17. The method according to claim 16, wherein a central control unit is provided which is connected to the at least two flowmeters via the communication system; and wherein the central control unit communicates the state variable to the control and evaluation units during operation so that the flowmeters select the corresponding data set of the plurality of data sets depending on the communicated state variable; or wherein the central control unit communicates the selected at least one data set on which the measurement is to be based to the control and evaluation unit during operation.

18. The method according to claim 16, wherein exactly one flowmeter selects the at least one data set during operation and communicates the selected at least one data set to the remaining flowmeters via the communication system.

* * * * *